United States Patent Office 3,485,910
Patented Dec. 23, 1969

3,485,910
METHOD FOR IMPARTING COATABILITY TO POLYOXYLMETHYLENE COMPOSITIONS
Daniel M. Kennedy, Jr., East Brunswick, N.J., assignor to Celanese Corporation, New York, N.Y., a corporation of Delaware
No Drawing. Filed Sept. 16, 1965, Ser. No. 487,895
Int. Cl. B29g *3/00;* B29f *1/00*
U.S. Cl. 264—129           3 Claims

ABSTRACT OF THE DISCLOSURE

A method of preparing coated plastic articles is disclosed and claimed wherein a base is made of a blend of a polyoxymethylene and a polymer of at least one ethylenically unsaturated ester of a saturated carboxylic acid, e.g. vinyl acetate. The resulting article has an adhesive-like surface thus enabling the polyoxymethylene article to be easily coated.

---

This application relates to thermoplastic blends and, more particularly, to polyacetal blends of enhanced decorability.

Polyacetals having at least 60 mol per cent of recurring oxymethylene units (—$CH_2O$—) derived from, e.g. formaldehyde, trioxane or another cyclic acetal, and optionally comprising in minor proportion mer units comprising carbon-to-carbon bonds in the polymeric chain, derived from a wide variety of monomers such as lactones, carbonates, cyclic acid anhydrides, glycidyl ethers, alkylene oxides, higher aldehydes or ethylenically unsaturated compounds such as vinyl ethers, styrene, vinyl acetate, vinyl methyl ketone or acrolein, are well known, as generally disclosed in Kern et al., Angewandte Chemie, 73, pp. 176–186 (1961), Sittig, M., Hydrocarbon Process and Petroleum Refiner, 41, pp. 13–170 (1962), and Weissermel et al., Kunstoffe, 54, pp. 410–415 (1964).

Moreover, compositions of polyacetals with various organic and inorganic polymeric and monomeric substances are also known to the art, especially where the polyacetal (although perhaps capable of being shaped into rubber-like articles) is of generally low molecular weight, low thermal stability, and poor mechanical strength, which properties preclude such end uses as pipes, automotive parts, blown bottles, etc.

The development of high strength polyacetals as, for example, those generally described in U.S. Patent No. 3,027,352, issued Mar. 27, 1962, to Walling et al. and British Patent No. 911,960, while providing suitable materials for such high strength end uses, occasioned the attempted application of various surface decorations essential for consumer acceptance in certain market areas.

Despite the availability of a wide variety of polyacetal compositions, it did not appear that any would exhibit enhanced decorability without further treatment. Indeed, such post-treatments have proven necessary for desirable adherence of top-coatings to the high strength commercial polyacetals, and now include the use of various sub-coats, such as those comprising nitrocellulose lacquers, as exemplified by the descriptions of French Patent 1,355,844 and U.S. Patent 3,141,789; etching systems, such as those comprising a strong organic or inorganic acid, e.g. as described in Belgian Patents 617,353 and 633,171 and French Patent 1,321,651; and/or various baking steps alone or in combination with the foregoing operations such as that of French Patent 1,348,084. These processes, while generally suitable to effect the desired adherence of the decoration, add further steps to the processing of the raw material, and often cause physical property losses and discoloration in areas not covered by the final decorative coating.

It has now been surprisingly discovered that blends of high molecular weight, high strength polyacetal resins with relatively small proportions of polymers of ethylenically unsaturated esters of saturated carboxylic acids exhibit greatly enhanced decorability without discoloration or loss in mechanical properties. Such a discovery was quite unexpected, since the addition to high strength polyacetals of minor proportions of a variety of other polymers did not substantially affect decorability.

More specifically, the blends comprise up to about 25 weight percent of the high polymeric additive. Preferably, the blends contain as little as about 1% by weight of a vinyl alkanoate polymer of intermediate molecular weight in combination with a polyacetal resin having a molecular weight of at least 20,000, most preferably containing a minor proportion, not in excess of 20 mol percent, of relatively more stable mer units such as oxyalkylene units. The blend may be provided in pellet form and the decorative topcoat applied directly to molded articles without further treatment.

The suitable polyacetals are the high molecular weight, normally solid, water insoluble species exhibiting crystalline melting points of at least 150° and having number average molecular weights ($M_n$) of at least 20,000, preferably at least 30,000, up to about 80,000 (represented by inherent viscosities as solutions of 0.1 gm. of polymer in 100 ml. of a mixture of 98 weight per cent of p-chlorophenol and 2 weight per cent of α-pinene at 60° C. of at least 0.9, and preferably at least 1.2 up to about 2.4). These resins may be homopolymers or copolymers, and polyacetals modified with chain transfer, end-capping, or cross-linking agents, such as the agents disclosed in U.S. Patent Nos. 3,017,389 of Langsdorf et al., issued January 16, 1962, and 2,964,500 issued December 3, 1960, to Jenkins et al.; 3,161,616 of Brown et al. issued December 15, 1964; commonly assigned application Ser. No. 60,555 filed by Dolce on Oct. 5, 1960, now abandoned, and U.S. Patent No. 3,337,503 issued to Schnizer, Heinz Seddon; and the Kern et al. and Sittig articles referred to hereinabove, are also operable. Where oxymethylene homopolymers are employed, modification with agents providing carboxylic acid or ether moieties is to be preferred.

The polyacetals generally exhibit 1× melt index values of between about 0.2 and 5.0 dg./min., preferably between about 0.5 and about 30 dg./min. and 10× melt index values of between about 10 and 900 dg./min., preferably not more than 500 dg./min. 10×/× ratios may range between 15 and 150 although values from 16 to 20 are preferred. All are of high mechanical strength, exemplified by tensile strengths of above 7500–8000 p.s.i., and Izod impacts above 0.5 ft.-lbs./inch notch.

The preferred copolymers have primary chains containing in addition to recurring oxymethylene (—$CH_2O$—) units, a minor proportion of relatively more stable interspersed mer units, such as those derived from the stabilizing comonomers described in the survey publications (Sittig, Weissermel et al. and Kern et al.) referred to above. Generally, the mer units contain at least two adjacent carbon atoms positioned in the polymeric chain, the aforesaid units preferably being —OR— units, wherein R is a divalent radical containing at least two carbon atoms directly linked to each other and positioned in the chain between the two valences, with any substituent in the R radical being inert. Most preferably, the —OR— units are oxyalkylene units wherein the alkylene moiety comprises up to about 5 carbon atoms positioned in the polymeric chain, e.g. oxyethylene, oxybutylene, etc.

The —OR— units are conventionally derived from oxacyclic compounds, and preferably ethers of the formula

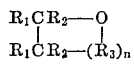

wherein each $R_1$ and $R_2$ is selected from the group consisting of hydrogen, lower alkyl and lower halogen substituted alkyl radicals and each $R_3$ is selected from the group consisting of methylene, oxymethylene, lower alkyl and haloalkyl substituted methylene, and lower alkyl and haloalkyl substituted oxymethylene radicals, and $n$ is an integer from zero to 3.

Representative such cyclic ethers, which may have up to about 10 carbon atoms, include ethylene oxide, 1,3-dioxolane, 1,4-dioxane, trimethylene oxide, pentamethylene oxide, 1,2-propylene oxide, 1,2-butylene oxide, 1,3-butylene oxide, and 2,2-di(chloromethyl) 1,3-propylene oxide. Most preferably cyclic ethers yielding oxyethylene units, e.g. ethylene oxide or 1,3-dioxolane are employed.

These comonomers are charged in an amount of about 0.1 to about 20 mol percent, preferably no more than 15 mol percent, based on the polyacetal reactants, and provide to the polyacetal chain (which comprises at least 60 mol percent and preferably at least 80 mol percent of recurring oxymethylene (—$CH_2O$—) units) up to about 20 mol percent of randomly interspersed —OR— units wherein R is a divalent radical containing at least two carbon atoms directly linked to each other and positioned in the chain between the two valences, with any substituent in the R radical being inert.

Particularly preferred polyacetal chains additionally have at least 0.01 up to about 7 mol percent of —OR— units as described above having carbon atoms linked to other chains. Such polymer chains may be prepared by additionally charging to the reaction zone from about 0.01 to about 10 mol percent of a variety of chain branching comonomers, such as compounds having at least two functional oxygen atoms including (1) cyclic ethers having at least two cyclic ether rings, and particularly those compounds having (a) at least two epoxy rings, (b) at least two dioxacyclo rings, or (c) at least one epoxy ring and at least one dioxacyclo ring, and (2) compounds having at least two oxa groups such as dialdehydes and diketones, preferably having from 3 to 20 carbon atoms. Representative such compounds include butadiene dioxide, resorcinol diglycidyl ether, butane diol diglycidyl ether, ethylene glycol diglycidyl ether, butane diol diglycidyl ether, ethylene glycol diglycidyl ether, vinyl cyclohexene diepoxide, pentaerythritol diformal, etc. Suitable termonomers are further disclosed in French Patent 1,345,218 and commonly assigned U.S. application Ser. No. 444,787 filed Apr. 1, 1965, now abandoned.

The polymeric esters are generally vinyl alkanoates, having, e.g. up to about 12 carbon atoms, and most preferably the vinyl ester substituent is derived from a lower alkenol, e.g. having up to about 6 carbon atoms, i.e. the esters are alkenyl alkanoates. Polymers of vinyl acetate, allyl acetate and the corresponding propionates and butyrates are exemplary. Copolymers comprising all proportions of mer units derived from a mixture of the foregoing monomers, or mixtures thereof comprising a minor proportion of other vinyl or vinylidene monomers, for example, vinyl halides such as vinyl chloride, aryl alkenes such as styrene, α-methyl styrene, etc., unsaturated carboxylic acid esters such as dibutyl fumarate, dibutyl maleate, methyl crotonate, etc., and especially the acrylates and methacrylates such as ethyl acrylate, methyl methacrylate, t-butyl acrylate, etc., unsaturated esters of carboxylic acids such as vinyl benzoate, unsaturated ethers such as n-butyl vinyl ether, phenyl vinyl ether, etc., alkenyl carboxylic acid nitriles such as acrylonitrile, methacrylonitrile, etc., alkenyl carboxylic acid amides such as acrylamide, methacrylamide, etc., vinyl substituted hetero-N-cyclics such as N-vinyl-2-pyrrolidone, vinyl pyridines, etc., olefins such as ethylene, propylene, isobutylene, 1-butene, 3-methyl-1-butene, 4-methyl-1-pentene, etc., and mixtures thereof, may also be suitably employed. Generally, however, the polyvinyl alkanoates contain at least 50 mol percent, and preferably at least 75 mol percent, of mer units derived from the alkenyl alkanoates having up to about 18 carbon atoms.

While the blend proportions may vary from about 1 to about 25 weight percent, certain proportions are preferred in specific embodiments, e.g. the 5 to 10% level appears to provide optimum mechanical properties. Compression molded samples exhibited excellent adhesion over the entire range and even at the lower levels, e.g. 1 to 5 weight percent, without any post treatment. Homogeneity of all melts was excellent and complete clarity was apparent at levels as high as 20 weight percent.

Injection molded samples prepared at conventional mold temperatures for the polyacetals, e.g. 90–95° C., required a baking treatment, e.g. 120° C. for a half hour to develop optimum adherence. Surprisingly, however, samples containing at least 10 percent polyvinyl alkanoate met all adherence tests without any post treatment when injection mold temperatures were raised to higher levels, e.g. 120° C. In fact, the improvement was obtained with 10–15 percent samples at higher mold temperatures although material temperatures were somewhat decreased.

Infrared examination by attenuated total reflection at the 50 mil and 60 mil surface of 60 mil slabs injection molded at conventional polyacetal mold temperatures shows less than one-half as much polyvinyl alkanoate at the 60 mil surface than at the 50 mil surface.

This effect is believed to be due to preferential surface solidification of the polyacetal at the relatively cold walls of the mold, due to the great difference between the melting points of the polyacetals (e.g. 162° C. for a commercial copolymer sample) and the second order glass transition temperature of the polyvinyl alkanoates (e.g. 30° C. for polyvinyl acetate). Apparently, higher mold temperatures overcome the effect of the preferential precipitation and provide the requisite blend composition for adherence at the polyacetal-coating interface. In fact, control of mold temperatures would appear to permit the regulation of the percent of polyvinyl alkanoate existing at the interfacial surface, thus indirectly controlling the degree of adherence. Thus, a non-decorable polyacetal pellet containing a non-homogeneous composition distribution, (e.g. a completely interior distribution) of polyvinyl alkanoate could be made decorable at selected surface portions by regulating mold temperatures. Portions of the molded article, e.g. bearings, bolts, screws, etc. requiring polyacetal strengths and surface characteristics e.g. lubricity, could be provided by bringing the polyvinyl alkanoate only to the surface of areas where considerations of decor are paramount.

Thus, a further aspect of this invention is a process for enhancing the decorability of polyacetal articles by controlling mold temperatures in the molding of certain of the blends described herein. More specifically, this aspect of the invention comprises injection molding blend feedstock comprising at least 10 and preferably 10 to 15 weight percent of polyvinyl alkanoate by heating said blend feedstock in a mold maintained at a selected temperature in the range from about 80 to about 130° C. and advancing the thus formed semi-molten mass of said blend into contact with a shaping surface and/or maintaining portions of said shaping surface in contact with selected portions of said blend material at temperatures in the same or an elevated range, e.g. 100 to 130° C. Thus temperatures of 110 to 130° C. may be employed in the initial plasticization and maintained throughout the molding cycle, thus improving adherence at all surfaces of the finished article, or conventional mold temperatures may be employed in the initial portion of the cycle, with the elevated range being applied to all or selected portions of the mold-blend interface.

A subsequent baking step also enhances decorability, and in this further aspect of the invention a molded article comprising the blend of this invention, and most preferably comprising from about 5 to about 10 weight percent of polyvinyl alkanoate, is subjected to temperatures of 115–160° C. for periods of at least 10 up to about 45 minutes.

Variation in the molecular weight of the polyvinyl alkanoate did not appear to affect the recorability of the blend compositions, and accordingly the full range of molecular weights is applicable. However, intermediate molecular weight polyvinyl alkanoates appeared to result in better mechanical properties and accordingly represent the preferred embodiment.

More specifically, while resins having molecular weights represented by viscosities (86.1 grams of polymer and sufficient benzene to make 1 liter of solution) of about 1.0 up to about 25 cps. may be employed, those exhibiting viscosities in the range of 10 to 20 cps. are preferred. Molecular weights are roughly the $10^3$ multiple of the viscosity values in cps. A particularly preferred species is a vinyl acetate homopolymer containing no more than 2.0 percent hydroxyl and having a molecular weight of about 20,000.

The compositions may be prepared in conventional manner, e.g. cosolution and coprecipitation, dry blending of flake, coextrusion, etc., but melt blending, wherein at least one component is maintained in plastic state, is preferred for ease of operation and optimization of homogeneity.

Thus, the blending is preferably carried out by charging one or both components in one or more batches, separately or as a master batch consisting principally of one component subsequently cut with additional amounts of the other component, to a reaction zone maintained at an elevated temperature above the melting point of at least one component, generally between about 100° C. and 220° C. and preferably between about 150° C. and 200° C., and vigorously mixing and shearing, for a period between about 1 and about 20 minutes until substantial homogeneity has been achieved.

Usually, a high shear mixing device, such as a "Brabender Plastograph" or a "Banbury" mixer, comprising oppositely driven spiral rotors enclosed within a mixing chamber, is employed. The "Banbury" mixing chamber comprises two overlapping cylindrical chamber sections with a ridge between them. The rotors revolve in opposite directions and at slightly different speeds, keeping the mixture in constant circulation. The ridge between the cylindrical chamber sections helps force intermixing, and the acute convergence of the rotors within the chamber walls imparts a smearing. Temperature control is achieved by the circulation of cooling water or steam through cores in the rotors and through cores in the walls of the mixing chamber. Pressure may be exerted on the mixing chamber by a weighted ram in the hopper throat.

The blending may also be carried out in a "Plastograph" blending device which comprises a jacketed chamber containing oppositely driven rotors having bladed surfaces of, e.g., sigma, delta, roller or cam configuration optionally blanketed in an inert gas, e.g., nitrogen, driven with a constant or variable speed ranging from a few r.p.m. up to about 200 r.p.m Temperatures in the range of about 165° C. up to 250° C. or higher are obtained by employing a suitable heating oil in the chamber jacket. Generally roller head rotors are employed driven at speeds in the range of 20 to 40 r.p.m. at temperatures between about 180 and 220° C. The plastograph blending may be carried out at different r.p.m. and temperatures within the ranges specified above for varied periods of time, giving appropriate consideration to the desirability of reducing shear to a point where mechanical degradation of the resin is minimized, and maintaining temperatures below the point where thermal degradation of the resin becomes substantial, etc. Thus, one may employ a higher speed with reduced treatment periods and slightly increased temperatures or decreased speed for longer times at decreased temperatures.

The blending may also be carried out in a roll mill apparatus having oppositely rotating hollow cylindrical rolls of, e.g. 12" diameter, driven at a speed in the range of 20 to 40 r.p.m., and steam heated to a temperature in the range of 165° C. to about 195° C. The cylindrical rolls have a variable clearance ranging down to a few thousandths of an inch which clearance is varied during the course of the milling. A typical run involves charging one or both resins to the rolls with a load time of about 3 to 5 minutes, and rolling for 4 to 5 minutes to melt. The blend, which adheres to the rolls, is kneaded with reduced clearance between the rolls for a period of about 5 minutes and then cut and cooled.

It is to be understood that conventional additives, including stabilizers, lubricants, fillers such as glass powder or chopped strand, finely divided copper, etc., coloring agents such as titanium dioxide, and dyes may be utilized with either or both of the resin components. Stabilized compositions comprising, e.g. at least one amidine compound such as melamine, cyanoguanidine together with a phenolic such as an alkylene bisphenol, e.g. 2,2'-methylene bis(6-t-butyl-4 methyl phenol) are preferred in the practice of this invention. Other polyacetal stabilizers are found disclosed in Kern et al., and Sittig articles referred to hereinabove, as well as U.S. Patent 3,152,101, issued to Dolce on Oct. 6, 1964, U.S. Patent 3,144,431, issued to Dolce, Berardinelli and Hudgin on Aug. 11, 1964, application Ser. No. 258,126, Patent No. 3,274,149, continuation-in-part of application Ser. No. 838,427, now abandoned filed by Berardinelli on Sept. 8, 1959, application Ser. No. 838,832, Patent No. 3,200,090, filed by Dolce and Hudgin on Sept. 9, 1959, application Ser. No. 262,348, Patent No. 3,219,727, continuation-in-part of application Ser. No. 841,690, now abandoned filed by Kray and Dolce on Sept. 23, 1959, application Ser. No. 256,146, now abandoned continuation-in-part of application Ser. No. 851,560, now abandoned filed by Berardinelli, Kray and Dolce on Nov. 9, 1959, U.S. Patent 3,133,896 of Dolce and Berardinelli, issued May 19, 1964 and application Ser. No. 4,881, Patent No. 3,156,669 filed by Kray and Dolce on Jan. 27, 1960. The disclosures of the above-mentioned patents and commonly assigned applications are incorporated herein by reference.

The blends of this invention are thermoplastic, moldable, of high thermal stability and excellent homogeneity. These blends are specifically exemplified herein as comprising two components, but as will be readily apparent to the artisan, more than one member of each class of components may be employed where desired in specific applications.

The molded compositions are of a selected degree of composition ranging from 0 to 100% of polyvinyl acetate across a given cross-section, but generally exhibit little or no inhomogeneity, the melts being of excellent clarity at levels as high as 20% of the polyvinyl alkanoate. Preferably, all portions of the articles comprise at least 5% up to no more than 25% of the polyvinyl alkanoate. Pellets containing composition distributions ranging from 20% in the interior to 5% at the surface and vice versa, are particularly preferred in specific embodiments.

Molded articles of the blend compositions may be prepared by any conventional methods, including but not limited to compression molding, injection molding, vacuum forming, impact forging, blow-molding, etc. These articles may be decorated with any otherwise suitable top-coats including paints, varnishes, metallic coatings, etc. or may serve as bases for laminates with organic film forming polymeric substances. Adherence is also important in applications where no decoration as such is applied but where labels are to be affixed or other materials fixedly attached to the surface as by gluing, and these applications are also envisaged. Representative coatings include nitrocellulose formulations, automotive paints, e.g. acrylic base lacquers or thermosets, alkyd-melamines, etc., organic resins such as the vinylidene chloride interpolymers with, e.g. acrylonitrile or acrylic esters such as methyl acrylate and itaconic acid, crotonic acid, maleic acid, etc., phenolics such as t-butylated phenol-formaldehydes, epoxy resins, e.g. of bisphenol A and epichlorhydrin, polyurethanes, e.g. of toluene diisocyanate and ethylene glycol adipate, polyesters, e.g. polyethylene terephthalate, polyvinyls such as ethylene/vinyl acetate copolymers, etc., metallics, such as copper or chrome plating formulations. It should be understood that such coatings may form the outer surface of an article or may be subbing coats for the application of additional layers of, e.g. a gelatino-silver halide coat, etc.

Laminates with any otherwise suitable organic resin may be readily prepared, including multi-ply structures with more than one type of resin layer other than the blend of this invention. Representative such organic resins include the cellulosics such as cellulose acetate, cellulose propionate, cellulose acetate butyrate, cellulose propionate butyrate, etc., the polyester such as polyethylene terephthalate, the polyvinylidene chlorides, the polyolefins such as polypropylene, etc.

The standard tests of decorability and adherence employed for the purposes of this specification and claims are elsewhere briefly described as the "Scotch" tape test and the scratch test. The "Scotch" tape test is carried out by removing surface grease from an injection molded 60 mil slab or a compression molded disc with, e.g. a carbon tetrachloride rinse, wiping and drying; applying the desired coating in a thin uniform coat; drying, e.g. in air overnight; scribing the dried coated surface with a razor blade in a cross-hatch pattern (squares of $\frac{1}{16}''$) over an area about ¾ to 1 inch square; applying an adhesive tape such as "Scotch" brand tape to the scribed surface; and quickly removing the tape in one motion. If any of the coating in the cross-hatch pattern is removed with the tape the sample is considered to have failed the test.

The scratch test is carried out by attempting to scratch (with removal of coating) the dried coated surface by applying the edge of a rounded circular metallic object (e.g. a coin) to the surface with moderate pressure.

The following examples supplement without limitation the description set forth hereinabove.

All melt index values were taken in accordance with ASTMD–1238–57T, under Condition E (designated "1×") or Condition F (designated "10×"). Thermal decomposition rate constants ($K_D$) were measured by preparing a 5 gm. sample in the form of $\frac{1}{8}''$ pellets containing 0.5% 2,2'-methylene bis(4-methyl-6-tertiary butyl phenol), and 0.1% cyanoguanidine as stabilizers, placing the sample in a circulating air oven maintained at 230° C., reweighing the sample after a 45 minute test period, and expressing the loss in weight as an average rate in units of weight percent per minute. All tests and physical measurements were taken on chemically stabilized samples.

EXAMPLE I

A homogeneous blend of 85 parts of an oxymethylene polymer containing about 2.0 percent of oxyethylene units (and having a melt index (1×) of 9.0 dg./min.) and 15 parts of a vinyl acetate polymer (1.7 percent hydroxyl; inherent viscosity in benzene of 1.2) was prepared by mixing components in a "Plastograph" at 190° C. for 10 minutes.

Films were prepared from the clear blend melt and a control melt consisting entirely of the oxymethylene copolymer. No gels or other inhomogeneities were evident in the blend film.

Both films were painted with "Lucite" an acrylic base automotive touch-up paint and dried overnight. Break and flake-off of the paint was tested by creasing the films through 180°. Very little paint break was apparent from the blend samples, whereas the control film showed a complete loss of paint at the crease.

A portion of the blend was compression molded into a 2" disc at 190° C., and painted. The disc was dried overnight, scribed with a razor blade into $\frac{1}{16}''$ squares, and "Scotch" brand tape applied. Paint adhesion was excellent, evidenced by the complete absence of paint removal as the tape was pulled off the disc. An oxymethylene copolymer sample exhibited substantial paint removal.

EXAMPLE II

Blends of an oxymethylene copolymer ("Celcon M–90" manufactured by Celanese Corporation of America) and a polyvinyl acetate ("AYAT" manufactured by Union Carbide) containing 1.0, 3.5, 5.0 and 10.0 weight percent, respectively of polyvinyl acetate were prepared by melt mixing in a "Banbury" mixer at 320° F. (160° C.) for 6 minutes. All samples exhibited thermal decomposition rate constants of less than 0.015 weight percent/min. when stabilized with 0.5% 2,2'-methylene bis(4-methyl-6-tertiary butyl phenol) and 0.1% cyanoguanidine. Compression molded specimens (2 x ⅛ inch discs) were prepared in a Carver press with air-cooled molds at 190° C. and 240° C. Injection molding was carried out in a Moslo 1 oz. injection machine at 238° C. material temperature, 93° C. mold temperature and 25,000 p.s.i. with a 60 second cycle. The compression molded samples in each instance and without further treatment passed the cross hatch tape adhesion test when spray painted with "Lucite," an acrylic base automotive touch-up paint. The injection molded samples similarly passed the adhesion test when heat treated at temperatures ranging from 120° C. for the 5 and 10 percent samples to 155° C. for the 1 and 3.5 percent samples. Physical properties of these latter samples were excellent as exemplified below for the 1 and 10 percent specimens.

| | Control 100% polyacetal copolymer | 1.0% PVAc | 10.0% PVAc |
|---|---|---|---|
| Izod impact (notched) ft. lbs./sq. in. | 1.17 | 1.35 | 1.19 |
| Tensile strength, p.s.i. | 8,760 | 8,440 | 7,450 |
| Tensile Modulus, p.s.i.×10⁶ | 0.394 | 0.430 | 0.405 |
| Tensile impact, ft. lbs./sq. in. | 76.4 | 100.2 | 91.2 |
| Elongation, percent | 38.8 | 34.0 | 42.3 |
| Vicat soft. temp., °C | 161 | 160.2 | 160 |

Similar results were obtained with 5, 10, and 15 percent samples employing a polyvinyl acetate having an inherent viscosity (ASTMD–1243–58T, Procedure A) of 0.12 and a softening point of 89.6° F. The samples also passed the scratch test after heat treatment.

EXAMPLE III 15 and 25% blends of polyvinyl acetate (having an inherent viscosity according to Procedure A of ASTM–D–1243–58T of 0.69, a softening point of 187° F. and a tensile strength of 4200 p.s.i.) in an oxymethylene copolymer containing 2.0 percent of oxyethylene units (and having a melt index (1×) of 2.5 dg./min.) were prepared in a "Banbury" mixer at 320° F. by mixing for 6 minutes. 10×/1× melt index ratios were 28.6, and 47.8 for 1× values of 3.56 and 4.77, respectively. A 3 x 3 x 50 mil injection molded slab (238° C. material temperature, 98° C. mold temperature, 25,000 p.s.i., 60 second cycle) prepared from the 25 percent blend passed the cross-hatch adhesion test without further treatment. The 15 percent composition required heat treatment. A similar run employing a high I.V. (1.13) polyvinyl acetate at 10 and 25 percent concentrations gave the same results.

EXAMPLE IV

A series of blends of polyvinyl acetate (inherent viscosity 0.69) and an oxymethylene-oxyethylene copolymer (melt index (1×) of 9.0 dg./min.) ranging in composition from 8 to 15 weight percent of the polyvinyl acetate were prepared, and injection molded at a material temperature of 227° C., a mold temperature of 120–125°

C., and a pressure of 25,000 p.s.i. with a 60 second cycle. The 10, 11, 12, 13, 14 and 15 percent samples all passed the cross hatch adhesion test without further treatment. The 8 percent sample required a heat treatment (120° C.; ½ hr.) to pass the test, as did a polyacetal control molded at the same mold temperatures. All samples passed the scratch test after heat treatment at 120° C. for ½ hour.

The embodiments of the invention in which an exclusive property or privilege is claimed are defined as follows:

1. A process for preparing coated plastic articles, comprising:
   (a) blending
      (1) an oxymethylene polymer having a molecular weight of at least 20,000 wherein said oxymethylene polymer comprises at least 60 mol percent of recurring oxymethylene units and from about 0.1 to about 20 mol percent of —OR— units, wherein R is a divalent radical containing at least two carbon atoms directly linked to each other and positioned in the chain between the two valences, and
      (2) from about 10 percent to about 25 percent by weight of said plastic article of a polymer of at least one ethylenically unsaturated ester of a saturated carboxylic acid containing up to about 12 carbon atoms and,
   (b) injection molding said blended composition at a mold temperature between about 110° and about 130° C. and a pressure of between about 5,000 and about 30,000 p.s.i. for a period of time between about 30 and about 75 seconds; wherein said injection molding step renders the surface adherently receptive to a coating to be applied so as to eliminate the need for further surface treatment
   (c) coating the injection molded composition whereby said coating adheres to said injection molded composition when
      (1) a cross-hatch pattern of 1/16 inch squares is scribed on the coated composition and
      (2) an adhesive tape is applied to and subsequently quickly removed from said coated composition.

2. The process of claim 1 wherein said ethylenically unsaturated ester of a saturated carboxylic acid is a vinyl alkanoate polymer having a molecular weight of between about 1500 and about 20,000.

3. The process of claim 2 wherein said vinyl alkanoate polymer is polyvinyl acetate.

References Cited

UNITED STATES PATENTS

| | | | |
|---|---|---|---|
| 3,064,310 | 11/1962 | Cooprider | 264—328 |
| 3,210,210 | 10/1965 | Ball et al. | 117—138.8 |
| 3,310,608 | 3/1967 | Matsubayashi et al. | 260—897 |
| 3,330,687 | 7/1967 | Nawakowski | 117—138.8 X |
| 3,236,929 | 2/1966 | Jupa et al. | 264—328 |

ROBERT F. WHITE, Primary Examiner

J. R. THURLOW, Assistant Exaimner

U.S. Cl. X.R.

117—138.8, 161; 260—67, 874; 264—328, 331